United States Patent
Mooij et al.

(10) Patent No.: US 10,623,409 B2
(45) Date of Patent: Apr. 14, 2020

(54) CONTROLLING ACCESS TO IP STREAMING CONTENT

(75) Inventors: Wim Mooij, Hoofddorp (NL); Andrew Augustine Wajs, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 377 days.

(21) Appl. No.: 14/387,213

(22) PCT Filed: Mar. 23, 2012

(86) PCT No.: PCT/EP2012/055174
§ 371 (c)(1),
(2), (4) Date: Feb. 3, 2015

(87) PCT Pub. No.: WO2013/139396
PCT Pub. Date: Sep. 26, 2013

(65) Prior Publication Data
US 2015/0180873 A1 Jun. 25, 2015

(51) Int. Cl.
*H04L 29/06* (2006.01)
*H04N 21/258* (2011.01)
(Continued)

(52) U.S. Cl.
CPC ............ *H04L 63/10* (2013.01); *H04L 9/0833* (2013.01); *H04L 9/0891* (2013.01);
(Continued)

(58) Field of Classification Search
CPC . H04L 63/0428; H04L 9/0833; H04L 9/0891; H04N 21/44263
(Continued)

(56) References Cited

U.S. PATENT DOCUMENTS

| | | | |
|---|---|---|---|
| 2004/0024688 A1* | 2/2004 | Bi | G06F 21/10 705/37 |
| 2010/0037060 A1* | 2/2010 | Irvine | G06F 21/6236 713/176 |

(Continued)

FOREIGN PATENT DOCUMENTS

EP 2429189 A1 3/2012

OTHER PUBLICATIONS

Hasshi Sudler, Effectiveness of anti-piracy technology:Finding appropriate solutions for evolving on-line privacy, 2012, Elsevier Inc., 0007/6813. pp. 152-156.*
(Continued)

*Primary Examiner* — Ashokkumar B Patel
*Assistant Examiner* — William B Jones
(74) *Attorney, Agent, or Firm* — Rimon PC; Marc Kaufman (57) ABSTRACT

There is described a method of controlling access to IP streaming content by a plurality of receivers. The method comprises the steps of (a) for each receiver in the plurality of receivers, providing that receiver with access to first control information for that receiver to enable that receiver to access a first portion of the content; (b) identifying a receiver from the plurality of receivers as an identified receiver; (c) updating the first control information so as to provide updated control information for each receiver, the updated control information being associated with a second portion of the content; and (d) configuring each receiver to fetch the updated control information for that receiver. For the identified receiver, the updated control information is invalid such that the identified receiver is unable to fully access the second portion of the content. A server configured to carry out the method is also described.

14 Claims, 5 Drawing Sheets

(51) Int. Cl.
*H04L 9/08* (2006.01)
*H04N 21/262* (2011.01)
*H04N 21/6334* (2011.01)
*H04N 21/8358* (2011.01)
*H04N 21/442* (2011.01)

(52) U.S. Cl.
CPC ..... *H04L 63/0428* (2013.01); *H04N 21/2585* (2013.01); *H04N 21/26258* (2013.01); *H04N 21/44236* (2013.01); *H04N 21/6334* (2013.01); *H04N 21/8358* (2013.01)

(58) Field of Classification Search
USPC ............................................ 705/37; 713/168
See application file for complete search history.

(56) References Cited

U.S. PATENT DOCUMENTS

| | | | | |
|---|---|---|---|---|
| 2010/0043081 | A1* | 2/2010 | Kiayias | H04L 9/083 726/30 |
| 2014/0033243 | A1* | 1/2014 | Chen | H04N 21/252 725/23 |
| 2014/0259044 | A1* | 9/2014 | Kirby | G06Q 30/0207 725/23 |
| 2014/0321642 | A1* | 10/2014 | El Aimani | H04L 9/3218 380/44 |

OTHER PUBLICATIONS

Aggelos Kiayias, Managing the Unmanageable: Putting Cryptography to Work for Digital Rights, Jul. 19, 2005, Association ofr Computer Machinery, vol. 1, p. 1, paragraph 4.*
International Search Report and Written Opinion cited in corresponding International Application No. PCT/EP2012/055174 dated Jan. 2, 2013.
Dalit Naor et al; "Revocation and Tracing Schemes for Stateless Receivers", International Association for Cryptologic Research, vol. 20011205:104841, Dec. 5, 2001.
Dimitri Jarnikov et al., "Watermarking for Adaptive Streaming Protocols", Sep. 2, 2011, Secure Data Management, Springer Berlin Heidelberg.
First Office Action issued by the State Intellectual Property Office (SIPO) of China dated Mar. 1, 2017 in connection with corresponding Chinese Patent Application No. 2012800717136, 24 pages.
Second Office Action issued by the State Intellectual Property Office (SIPO) of China dated Oct. 20, 2017, in connection with corresponding Chinese Patent Application No. 201280071713.6, 11 pages.
Hardjono T et al; "Group key management for IP multicast: model & architecture", Jun. 20, 2001.
European Patent Office, EPO Summons to attend oral proceedings for European Application No. 12711825.5 dated Dec. 4, 2019.

* cited by examiner

Figure 6

CONTROLLING ACCESS TO IP STREAMING CONTENT

RELATED APPLICATION DATA

This application is the National Stage of International Patent Application No. PCT/EP2012/055174, filed Mar. 23, 2012, the disclosure of which is hereby incorporated by reference in its entirety.

FIELD OF THE INVENTION

The present invention relates to controlling access to IP streaming content by a plurality of receivers.

BACKGROUND OF THE INVENTION

Increasingly, the internet communication infrastructure is used to provide access to multimedia content such as TV content. This ranges from user-contributed material, to advertising-sponsored material, to premium content. The premium content material is often distributed at high quality and may consist of recently released movies or live events such as popular sports events and concerts.

Premium content is often secured by a Digital Rights Management (DRM) system. DRM technology is well known and there are a number of DRM systems presently available for distributing content to clients. A DRM system typically consists of creating a file with encrypted content, a description of the usage rules, and a content decryption key encrypted with a key associated with a specific DRM client. The DRM protected content can be distributed to the client as a file or as a stream. The DRM client first processes the usage rules, and possibly the encrypted version of the content decryption key, before starting the decryption of the content data. In general, the DRM client is implemented in a secured software application and is often closely integrated with the content player.

Premium content is commonly delivered (or "streamed") using Internet Protocol TV (IPTV). IPTV is a system through which multimedia services such as television/video/audio/text/graphics/data may be delivered over IP based networks that are managed to provide the required level of quality of service and experience, security, interactivity and reliability. In particular, IPTV provides secure and reliable delivery to subscribers of entertainment video and related services. These services may include, for example, Live TV, Video On Demand (VOD) and Interactive TV (iTV). These services are delivered across an access agnostic, packet switched network that employs the IP protocol to transport the audio, video and control signals. In contrast to video over the public Internet, with IPTV deployments, network security and performance are tightly managed to ensure a superior entertainment experience, resulting in a compelling business environment for content providers, advertisers and customers alike.

Live content is often distributed in a stream since the content file only is complete at the end of the event. Apple's HTTP Live Streaming (HLS), Microsoft's Smooth Streaming, and Adobe's HTTP-based Dynamic Streaming (HDS) are content delivery solutions that use standard HTTP web servers to deliver streaming content, obviating the need for a streaming server. HTTP packets are firewall friendly and can utilize standard HTTP caching servers on the web. This decreases total bandwidth costs associated with delivering the video, since more data can be served from web-based caches rather than the origin server, and it improves quality of service, since cached data is generally closer to the viewer and thus more easily retrievable.

Special "adaptive streaming" protocols exist that enable a subscribing client to adapt to dynamic changes in the effective data rate with which content can be streamed to the client. Typically, such protocols require the server to prepare different data rate encodings of the content. If the client sees a change in data rate, it can switch to a encoding version that matches the changed transmission conditions. In order to reduce the bandwidth, the adaptive streaming protocols are designed to facilitate caching of portions of the content in the nodes of the distribution network. These caches require that a content portion has a unique identifier, so each cache can determine if it can fetch the content portion from local storage or it needs to pass on the content request to a node closer to the server. HTTP-based adaptive streaming technologies generally have two components: the encoded audio-visual content chunks themselves, and the manifest file that identifies the content chunks for the player and contains their URL addresses. The MPEG DASH (ISO/IEC 23009-1) draft standard may eventually replace most of the proprietary adaptive streaming formats.

A common attack against the live streaming of premium content (e.g. sports and concerts) consists of an authorised client grabbing the decoded output (e.g. by simply using a camera), processing it in a content encoder, and redistributing the re-encoded material in an unauthorised manner (e.g. using P2P or another infrastructure). Often the redistribution of the content uses protection technology to enable the attackers to charge a fee for their unauthorised service.

What is needed is a countermeasure against such redistribution attacks that is suitable for disturbing the unauthorised redistribution service. The present invention aims to provide such a countermeasure.

SUMMARY OF THE INVENTION

According to a first aspect of the present invention, there is provided a method of controlling access to IP streaming content by a plurality of receivers. The method comprises the steps of (a) for each receiver in the plurality of receivers, providing that receiver with access to first control information for that receiver to enable that receiver to access a first portion of the content; (b) identifying a receiver from the plurality of receivers as an identified receiver; (c) updating the first control information so as to provide updated control information for each receiver, the updated control information being associated with a second portion of the content; and (d) configuring each receiver to fetch the updated control information for that receiver. For the identified receiver, the updated control information is invalid such that the identified receiver is unable to fully access the second portion of the content.

Thus, the present method enables a content provider to restrict access to a later (second) portion of content for one or more identified receivers. Thus, if a receiver is quickly identified as taking part in an unauthorised redistribution of the content, the content provider may use the present method to deny that identified receiver access to the remainder of the content. Such action will also impact upon the unauthorised redistribution of the content. Hence, the present method acts as a countermeasure against redistribution attacks by identified receivers. In particular, the present method implements countermeasures against redistribution attacks by configuring each client to periodically fetch control information that is provided in correct form to well behaved clients only. As will be described further below, the control information can be a playlist or manifest file or key management information. Also, the control information may be placed in small individual files or in fragments in a combined file.

Preferably, for receivers other than the identified receiver in the plurality of receivers, the updated control information is valid such that said other receivers are able to access the second portion of the content. Thus, there is no disruption to the content access for receivers other than the identified receiver.

In one embodiment, content keys (i.e. content decryption keys) are used to control access to the content. In this embodiment, the control information comprises key management information for providing access to a content decryption key for decrypting the content. For the identified receiver, the updated control information does not enable the identified receiver to access an updated content decryption key for the second portion of the content. Advantageously, for each receiver, the key management information comprises a unique key for that receiver, the unique key being operable to enable that receiver to access the content decryption key for decrypting the content. In an alternative embodiment, playlists are used to control access to the content. In this embodiment, the content comprises a time series of content chunks and the control information comprises a playlist of content chunk references, each content chunk reference being a reference to a respective content chunk of the content. For the identified receiver, the updated control information does not include a valid playlist of content chunk references for the second portion of the content. Thus, the present method enables a content provider to deny the identified receiver access to a valid playlist of content chunk references. In a further alternative embodiment, manifest files are used to control access to the content. In this embodiment, the content comprises a time series of content chunks disposed in a content file and the control information comprises a manifest file which enables a receiver to generate URLs relating to content chunks in the content file. For the identified receiver, the updated control information does not include a valid manifest file to enable the identified receiver to generate valid URLs for content chunks associated with the second portion of the content.

In one embodiment, the step of configuring each receiver to fetch the updated control information for that receiver comprises providing each receiver with an expiration time for the first control information, by which expiration time that receiver is to fetch the updated control information for that receiver. In this embodiment, the expiration time may be provided to the receivers well in advance so that the receivers have sufficient time to fetch the updated control information before starting to receive the second portion of the content. Thus, there is seamless switching from the first control information to the updated control information. Optionally, the expiration time may be provided to each receiver using the HTTP 1.1 expiration time mechanism. Alternatively, when using playlists or manifest files, the expiration time may be provided to each receiver using expiration mechanisms supported by the playlist (or manifest) file format (e.g. Apple and MPEG-DASH have built-in mechanisms for issuing updates to manifest files). Fetching the updated control information enables a receiver to access the content after the expiration time, so long as the updated control information is valid.

In one embodiment, the content is fingerprinted. In other words, for each receiver, there is an associated individually watermarked (i.e. fingerprinted) version of the content provided to that receiver for decoding and outputting. The fingerprinting may be implemented using content keys, or using playlist/manifest files which are unique to individual receivers. In this fingerprinted content embodiment, the step of identifying a receiver from the plurality of receivers as an identified receiver comprises detecting a fingerprint associated with the identified receiver in an unauthorised instance of the content. Thus, an authorised receiver that is involved in unauthorised redistribution of the content may be prevented from accessing the full content. Hence, the present method provides a countermeasure against unauthorised redistribution attacks.

In one embodiment, for each receiver, the control information for that receiver is stored in a different file from files used to store the control information for other receivers in the plurality of receivers. In other words, each receiver has their own respective file on the server which stores the control information for that receiver. In an alternative embodiment, for at least a subset of the plurality of receivers, the control information is stored in a single combined file for that subset of receivers; and, for each receiver in the subset of receivers, the control information for that receiver is stored in a different file location from the file locations used to store the control information for other receivers in the subset of receivers. In this alternative embodiment, the control information for some or all of the plurality of receivers is stored in a single combined file, but each receiver has a specific file location for that receiver in which the control information for that receiver is stored. This provides the advantage that the server need only update a single file with updated control information, rather than updating a set of individual files.

In one embodiment, for the identified receiver, the updated control information is invalid such that the identified receiver is unable to access any of the second portion of the content. Thus, the identified receiver is denied access to the entirety of the second portion of the content. Alternatively, a substitute content stream may be provided to the identified receiver in place of the second portion of the content, or a disrupted content stream may be provided to the identified receiver in place of the second portion of the content.

In one embodiment, the updated control information for the identified receiver comprises a null file entry. This is one way of denying the identified receiver access to the entire second portion of the content. The null file entry could simply be a null file entry at the file location for the identified user in a single combined file of control information. Alternatively, the null file entry could be an empty file if there is an individual control information file per receiver.

In one embodiment, the content comprises a time series of content chunks, and the first and second portions of the content are each associated with a respective integer number of content chunks. Thus, updates of control information are synchronised with the start of a content chunk.

According to a second aspect of the present invention, there is provided a server configured to carry out the method of the first aspect.

According to a third aspect of the present invention, there is provided a computer program which, when executed by a processor, causes the processor to carry out the method of the first aspect.

According to a fourth aspect of the present invention, there is provided a data carrying medium carrying the computer program of the third aspect. In one embodiment, the data carrying medium is a storage medium or a transmission medium.

Other preferred features of the present invention are set out in the appended claims.

BRIEF DESCRIPTION OF THE DRAWINGS

Embodiments of the present invention will now be described by way of example with reference to the accompanying drawings in which.

DETAILED DESCRIPTION OF A PREFERRED EMBODIMENT

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

European Patent Application No. 10175973.6 and International Patent Application No. PCT/EP2011/065561, both of which are incorporated herein by reference in their entirety, describe the use of an adaptive streaming protocol to configure a client to produce an output with a watermark unique to that client. A client-specific watermark of this kind is also referred to as a fingerprint. The adaptive streaming protocol of EP10175973.6 and PCT/EP2011/065561 has also been published in an article entitled "Watermarking for Adaptive Streaming Protocols" (pages 101-114 of the Proceedings of the 8th VLDB Workshop, SDM 2011 Seattle, Lecture Notes Computer Science 6933, Springer Verlag, ISBN 978-3-642-23555-9). A content server (i.e. head-end) architecture for this adaptive streaming watermarking protocol is shown schematically in FIG. 1 and briefly described below. The content server system 10 of FIG. 1 includes a content generator 12, quality level encoders 14, chunk generators 16, chunk modifiers 18, a chunk store 20, a playlist generator 22, a synchroniser 24, and a network interface 26 connectable to a network 28.

Figure 1:
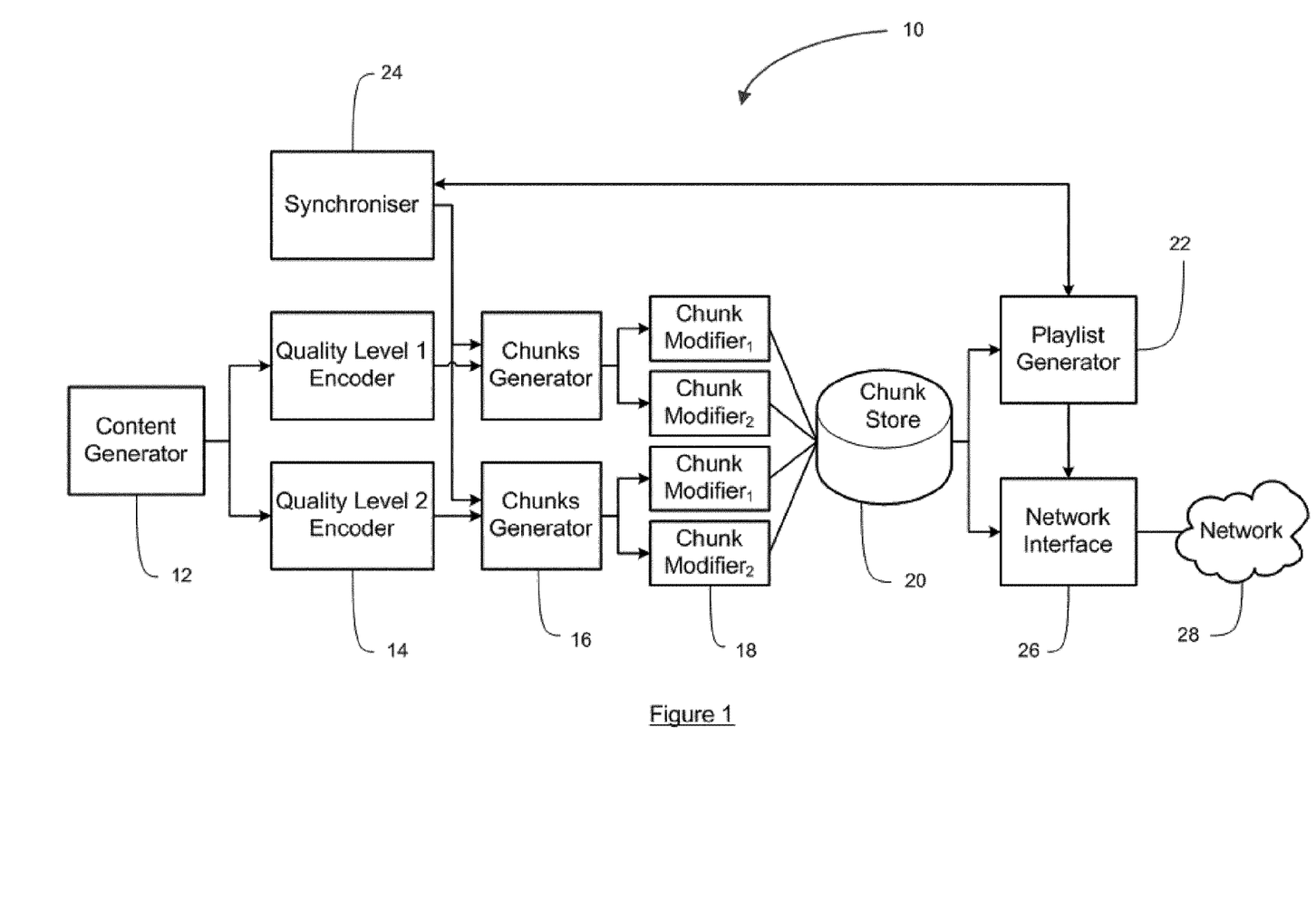
FIG. 1 schematically illustrates an example content server system in which fingerprint watermarking may be deployed.

Content is initially generated by the content generator 12. The original content from the content generator is received by the quality level encoders 14 which provide multiple copies of the same original content with different encoding characteristics, such as different bit-rates and/or different spatial resolutions. In the example of FIG. 1, two different quality level copies of the content are generated, but more may be provided if desired. The provision of different quality levels of the same content allows a user to continue to stream the content, even if their data bit rate changes during the streaming. In other words, the system adapts based on the available bit rate or required spatial resolution for a particular client/receiver.

Each quality level encoder 14 is associated with a respective one of the chunk generators 16. Each chunk generator 16 receives the encoded content from the respective quality level encoder 14, and divides the encoded content into a plurality of content chunks. Each content chunk corresponds to a different time slice of the encoded content. In other words, a content chunk is a 5-10 second chunk (or portion) of the content. A typical movie typically consists of over a thousand content chunks. The chunk generators 16 are synchronised by a synchroniser 24 to enable smooth transitions between content chunks of different quality levels. In an alternative embodiment, the step of chunk creation by the chunk generators 16 may precede the step of generation of different quality levels by the quality level encoders 14.

The content chunks from the chunk generators 16 are received by the chunk modifiers 18. In particular, each content chunk is duplicated and processed differently so as to be converted into two different modified content chunks. In other words, one duplicate copy of each content chunk is received and processed by a first chunk modifier 18, and the other duplicate copy of each content chunk is received and processed by a second chunk modifier 18. The first and second chunk modifiers 18 each process the content chunks in a different way. For example, the first chunk modifier 18 could apply a first watermark to received content chunks, whereas the second chunk modifier could apply a second watermark to received content chunks. More than two chunk modifiers 18 per chunk generator 16 could be included if desired. According to the present invention, the modified content chunks may then each be encrypted (not shown in FIG. 1) using a content key $CK_t$ unique to the time frame t of the content chunk. Subsequently, the modified content chunks are sent to the chunk store 20 for storage. Each content chunk is advantageously stored with a non-predictable name.

The playlist generator 22 generates playlists for clients. Each playlist comprises a sequence of content chunk references generated on the basis of information in the chunk store 20. Without a playlist, it is not useful to access the chunk store 20 due to the non-predictable names associated with each content chunk. Since the original content chunk for a given time frame is made available in different quality levels, this provides a layer of indirection in the playlist that gives a recipient device the option to select the most suitable content chunk. The duration of the chunk rendering is shared between the synchroniser 24 and the playlist generator 22. The playlist generator 22 produces a unique playlist (i.e. a unique sequence of content chunk references) for each client. The playlists are provided to the clients by means of the network interface 26 for the network 28.

Figure 2:
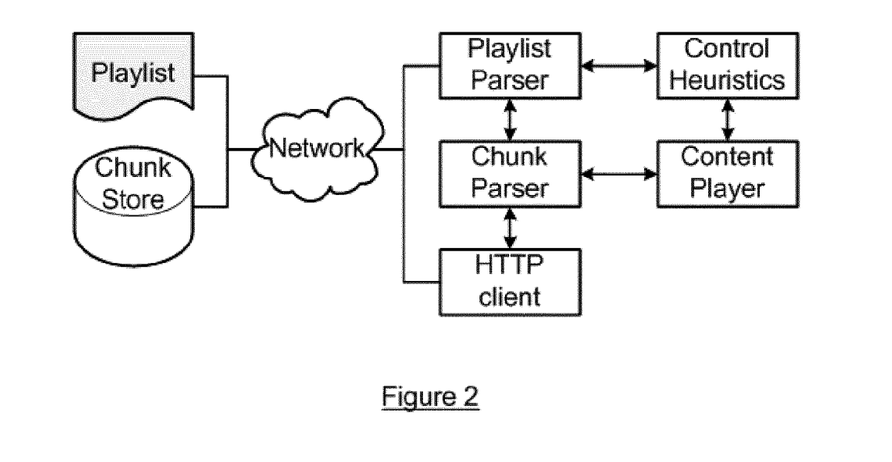
FIG. 2 schematically illustrates the client interaction with the content server system of FIG. 1.

The client interaction with the content server 10 is shown schematically in FIG. 2. The client uses its respective playlist to fetch content chunks for processing by the content decoder in the client. Each chunk is retrieved by the client using regular HTTP GET commands from the server. The unique sequence of chunks in the client playlist produces a detectable watermark signal in the output of the client's content decoder that is not visible to the user. The watermark sequence depends on the chunk sequence, so the playlist with chunk sequences determines the watermark that will be embedded into the output of the content decoder. As previously mentioned, this mechanism is preferably combined with different quality level encodings for the content streams. In other words, in fetching the content chunks, the effective bandwidth is used to determine the suitable quality level. This functionality is supported by a wide range of content players.

In summary, European Patent Application No. 10175973.6 and International Patent Application No. PCT/EP2011/065561 relate to fingerprinting streamed content.

They describe the use of playlists to reference content chunks that are watermarked differently. By issuing a unique playlist containing an individualised sequence of chunk references to a receiver, a content server can ensure that the decoded output of the content player contains a watermark (fingerprint) unique to that receiver. Furthermore, the content may be adaptively streamed at different quality levels depending on the available bandwidth for each client/receiver.

An alternative known method of fingerprinting content uses content keys to provide each receiver with a unique version of the decoded output, as described, for example, in EP1264436, the contents of which are incorporated herein by reference. In particular, there may be two or more differently watermarked versions of selected ones of the content chunks. The differently watermarked versions are then encrypted in different ways (e.g. using different encryption algorithms or using different encryption keys). Each receiver is then provided with access to a unique set of content keys which enable that receiver to decode only one version of each selected content chunk. Thus, the decoded output of each receiver will contain different watermarks depending on the unique set of content keys available to that receiver. Thus, the decoded output of each receiver is "fingerprinted" such that watermark detection on the decoded output may be used to identify the individual receiver associated with that decoded output.

Figure 3:
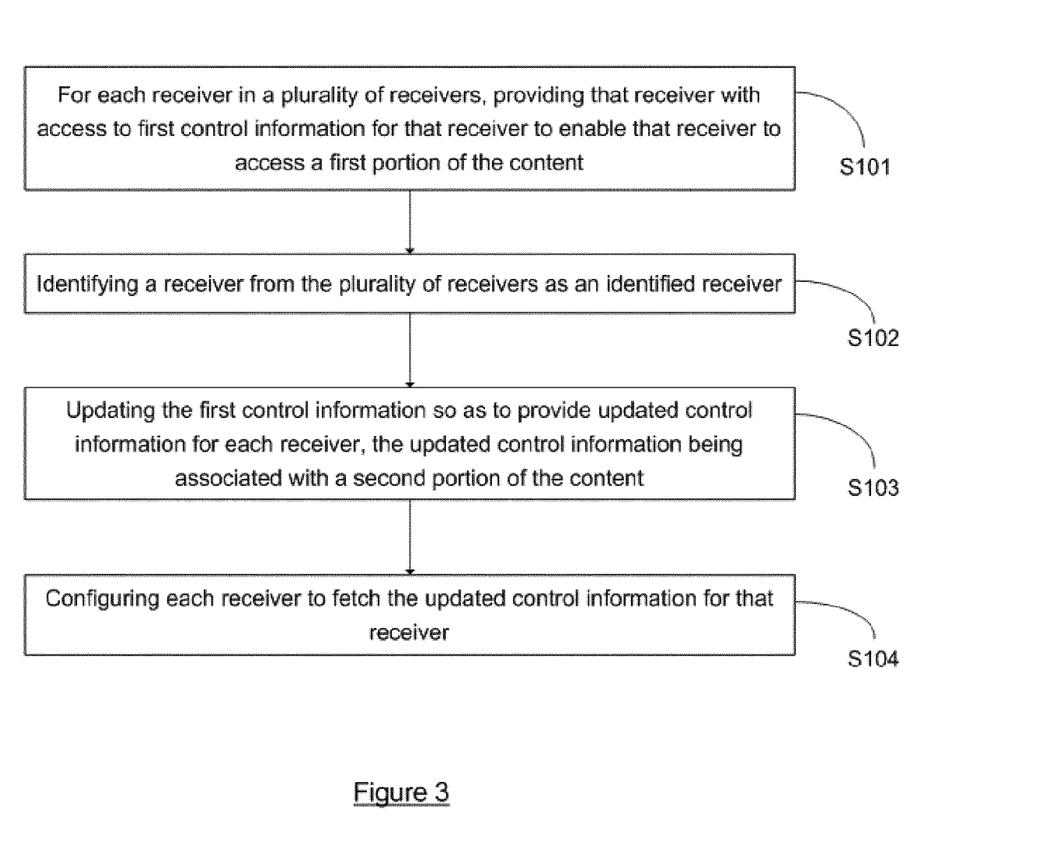
FIG. 3 is a flow chart schematically illustrating the general methodology of the present invention.

The content server system of FIG. 1 may be employed as a server for IP content streaming (e.g. an IPTV server) to assist in implementing countermeasures against pirates (i.e. receivers who participate in redistribution attacks) in accordance with the present invention. FIG. 3 is a high level flow chart showing steps involved in the present method of controlling access to IP streaming content (e.g. IPTV content) by a plurality of receivers. The content is fingerprinted such that each receiver is provided with access to a respective individually watermarked version of the content. Thus, subsequent watermark/fingerprint detection enables a receiver to be identified based on the content version that they have received.

At step S101, for each receiver in the plurality of receivers, that receiver is provided with access to first control information for that receiver to enable that receiver to access a first portion of the content. For example, if employing the system of FIG. 1, the first control information may comprise a first playlist of content chunks corresponding to the first portion of the content. Thus, each receiver would be able to access their own uniquely fingerprinted version of the first portion of the content. In an alternative embodiment, the control information may comprise key management information, which may be any form of data used to distribute a set of content decryption keys to individual receivers. Again, the key management information would be provided in such a way that each receiver would be able to access their own uniquely fingerprinted version of the first portion of the content (e.g. as in EP1264436). The control information may be placed in small individual files or in fragments in a combined file.

At step S102, a receiver from the plurality of receivers is identified as an identified receiver. For example, the adaptive streaming watermark technology of FIG. 1 allows the authorised content server to insert a respective unique watermark (i.e. a fingerprint) in the decoded output stream of each receiver. This fingerprint is robust enough to remain detectable in re-encoded content. Therefore, if an unauthorised redistribution of the first portion of content is identified, the redistributed content may be analysed to detect fingerprints. Based on the detected fingerprint(s), it is possible to identify the corresponding receiver(s) and thereby determine which identified receiver(s) are participating in the unauthorised redistribution attack. Knowledge of the identity of the identified receiver(s) forms the basis for countermeasures against the unauthorised redistribution attack.

At step S103, the first control information is updated so as to provide updated control information for each receiver. The updated control information is associated with a second portion of the content. At step S104, each receiver is configured to fetch (or get or obtain or request) the updated control information for that receiver. Thus, in order to try to access the second portion of the content, each receiver is configured to fetch the updated control information. If a receiver does not fetch the updated control information, they will not be able to access the second portion of the content. If employing the system of FIG. 1, the updated control information could comprise an updated playlist of content chunks corresponding to the second portion of the content. However, importantly, the updated control information for the identified receiver is invalid such that the identified receiver is unable to fully access the second portion of the content. Thus, using the system of FIG. 1, the updated control information for the identified receiver could be an invalid playlist of content chunks for the second portion of the content. Thus, the identified receiver is unable to fully access the second portion of the content such that the unauthorised redistribution of the content by the identified receiver(s) is disturbed. Other receivers (i.e. those that have not been identified as identified receiver(s)) see no change in the service provided—they simply continue to fetch valid updated control information, as required.

Hence, the above-described methodology implements countermeasures against redistribution attacks by configuring each client/receiver to periodically fetch control information that is provided in correct form to well-behaved clients only (i.e. clients other than the identified receiver(s)). It will be understood that by requiring each receiver to fetch updated control information, the content server may disturb unauthorised redistribution attacks by simply generating invalid control information and placing that information on the content server for collection by the identified receiver(s). There is no need for the content server to actively send new control information to all receivers. Thus, the present methodology is very efficient at the head-end.

It is possible to contrast the efficient head-end methodology of the present invention with a potential alternative countermeasure against unauthorised redistribution attacks. In particular, one alternative option would be to use the DRM system to disable the DRM client/receiver from decrypting the protected content. However, a countermeasure based on using a new content decryption key requires that the DRM system issues the new content decryption key to all DRM clients excluding the DRM clients that have been identified as participating in the content redistribution attack (i.e. the new content decryption key needs to be issued to all receivers that have not been identified as identified receivers). This means that almost all clients need to obtain the new content decryption key to implement the countermeasure. Using the DRM system in the countermeasure results in a significant overhead as the DRM systems do not support efficient updating of the content decryption key. As a consequence it may take a significant time to implement the countermeasure for popular live events with a large number of DRM clients. A further complication of using the DRM system to implement the countermeasure is that this does not provide a synchronised and seamless switching of the clients to start using the new content decryption key. In contrast, the present invention provides both efficient and seamless implementation of countermeasures against unauthorised redistribution of live TV events distributed over IP communication infrastructures such as Content Distribution Networks (CDNs).

Embodiments and technical details of the present invention are described in further detail below.

Implementing Countermeasures

Figure 4:
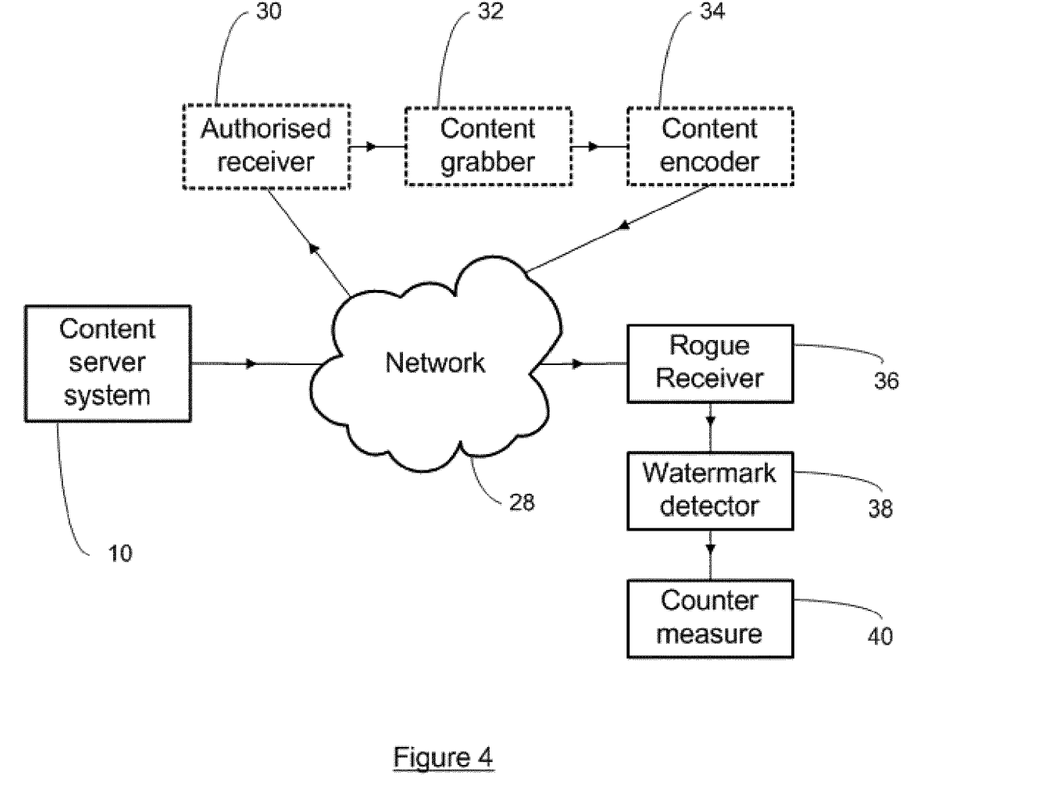
FIG. 4 schematically illustrates an exemplary system for implementation of countermeasures.

FIG. 4 schematically illustrates an embodiment of a system for the implementation of countermeasures.

The content server system 10 is connected to the network 28, as previously described with reference to FIG. 1, for example.

The dotted components in FIG. 4 depict an unauthorised redistribution attack. In particular, an authorised receiver 30 obtains the content from the content server system 10 via the network 28 in an authorised manner (cf. step S101 in FIG. 3). A content grabber 32 then grabs the decoded output from the authorised receiver 30. The grabbed content is then re-encoded by a content encoder 34 and redistributed via the network 28 in an unauthorised manner (i.e. without any authorisation of the rights owner / content server system 10). The content from the unauthorised redistribution attack is distributed via the network 28 to a number of rogue receivers.

In order to apply countermeasures against the redistribution attack, one of the rogue receivers 36 is used to determine which authorised receiver 30 is taking part in the redistribution attack (i.e. the rogue receiver 36 is used to identify the identified receiver in step S102 of FIG. 3). This is accomplished by analysing the output of the rogue receiver 36 using a watermark detector 38 so as to detect any watermark/fingerprint present in that output. As previously mentioned, due to the robustness of the watermarks inserted by the content server system 10, such watermarks are generally still able to be detected even after processing by the content grabber 32 and the content encoder 34. One a watermark has been detected, due to the uniqueness of the watermarks for each authorised receiver, it is possible to identify the authorised receiver 30 associated with that watermark. The identity of the authorised receiver 30 taking part in the redistribution attack is then forwarded to the countermeasure component 40 for taking action against the identified receiver 30.

A typical countermeasure prevents the identified receiver 30 from being able to obtain the content stream from the content server system 10 via the network 28. An alternative countermeasure may provide the identified receiver 30 with access to an alternate content stream or a disrupted content stream from the content server system 10 via the network 28. Thus, the countermeasure component 40 may form part of the content server system 10, or may be coupled (e.g. via the network 28) to communicate with the content server system 10. As described above with reference to step S103 of FIG. 3, the countermeasure of the present invention is implemented by updating control information (e.g. a playlist or manifest file or key management information) provided by the content server system 10. In particular, the first control information provided by the content server system 10 in step S101 only provides each authorised receiver with access to a first portion of the content. Having identified the identified receiver (i.e. the authorised receiver 30 taking part in the redistribution attack) using the watermark detector 38 in step S102, the first control information is updated for each receiver. The updated control information is associated with a second portion of the content. The countermeasure is applied by providing invalid updated control information for the identified receiver 30 such that the identified receiver 30 is unable to fully access the second portion of the content.

In general, the countermeasure relies on providing incorrect (i.e. invalid) control information to the identified clients that have been identified as participating in a content redistribution attack.

Playlist/Manifest File Implementation of Countermeasures

As mentioned above, the control information provided on the content server may be a playlist. In this embodiment, the content comprises a time series of content chunks and the control information comprises a playlist of content chunk references, each content chunk reference being a reference to a respective content chunk of the content. In the case of the Apple® IETF specification, the playlist is a .m3u file which references either content chunks (small content files on a server) or another .m3u playlist file. The Microsoft Silverlight® adaptive streaming specification uses .ismc manifest files. Using Microsoft Silverlight®, there is a single manifest file for a single content file. The manifest file enables a receivers to reference content chunks (fragments) contained in the content file as URLs. In other words, the manifest file serves to enable the receiver to create the URLs for parts of the content. This can even be done for real time streaming content where fragments become available in the future only. Each URL includes a respective start time which the server uses to calculate the offset at which a particular content chunk is located in the content file. Thus, unlike the playlist file, the manifest file does not itself contain the content chunk references. Nonetheless, these two mechanisms provide the same functionality in a different way. In particular, both mechanisms are able to provide control information (in the form of a playlist or manifest file) that enables a receiver to generate (or issue) content chunk references. One benefit of the Microsoft approach is that the content server deals with a single content file rather than with a large number of small content chunk files, which increases efficiency. Other audio-video adaptive streaming specifications have similar models in order to leverage existing generic internet caching technology to increase bandwidth and server efficiencies.

In one embodiment (e.g. using the content server system of FIG. 1), the control information is a playlist. Updates to playlist files can be used to add new references to content chunks that are going to be used in a future part of the live content stream. Thus, with reference to step S101 of FIG. 3, each receiver is provided with access to a respective first playlist unique to that receiver to enable that receiver to access the first portion of the content. Then, with reference to step S103 of FIG. 3, the first playlists are updated so as to provide respective updated playlists for each receiver. The updated playlists are associated with a second portion of the content. Without their updated playlist, a receiver cannot reference the appropriate chunks to generate the content stream for the second portion of the content. Since each receiver has a playlist that is unique to that receiver, the playlist for the identified receiver 30 may be generated to include invalid data that implements the intended countermeasure (some form of disruption of the redistribution service). For example, the playlist for the identified receiver 30 could be an empty or null playlist. Alternatively, the playlist for the identified receiver 30 may provide an incorrect list of content chunks (i.e. a list of content chunks which do not correspond to the second portion of the content). Thus, the identified receiver 30 is unable to fully access the second portion of the content such that the unauthorised redistribution of the content by the identified receiver is disturbed. Other receivers (i.e. those that have not been identified as taking part in the redistribution attack) continue to receive valid updates to their respective playlists. Similarly, in the manifest file implementation, the manifest file for the identified receiver 30 could be an empty or null manifest file. Alternatively, the manifest file for the identified receiver 30 may enable the receiver to generate incorrect URLs (i.e. URLs which do not correspond to content chunks associated with the second portion of the content).

Step S104 of FIG. 3 involves configuring each receiver (or client) to fetch updated control information for that receiver. The updated control information is an updated playlist in this embodiment, and there are a number of ways in which the receivers may be configured to fetch the updated playlists from the server. For example, when a receiver is initially provided with the first playlist, the HTTP 1.1. expiration mechanism may be used to inform the receiver about the time when an updated playlist needs to be fetched. Since the updated playlists contain content chunk references for future content (e.g. a second portion of the content), the content server can schedule sufficient time for all receivers to obtain their unique updated playlists before starting to use the new content chunk references provided in the updated playlists (i.e. before the second portion of the content is streamed). This means that all receivers can seamlessly switch to the updated playlists. Some adaptive streaming protocols (e.g. Apple®, MPEG DASH) have a built in mechanism for issuing updates to manifest files. This can be used as an alternative to use of the HTTP 1.1 expiration protocol.

The incremental updating and loading of the playlist (or manifest) files can be implemented in existing client implementations. Hence, the present methodology is compatible with existing client functionality and is agnostic to any content decoder or DRM specific capabilities.

Some clients support content player implementations that have support for plug-in modules that serve to provide additional functionality. If the backward compatible incremental updates of playlists is not supported by a client, a plug-in module may take on this functionality. In this variant, the plug-in module to the content decoder in the client is configured to implement the countermeasure. The plug-in module fetches updated control information from a file at a time provided by the server. This can be playlist or manifest file information, as described above. An alternative implementation is described below with reference to the use of content keys.

Content Key Implementation of Countermeasures

A plug-in module can implement a file update mechanism for unique information that the content decoder needs in order to process the content stream. In one embodiment, the control information comprises key management information for providing access to a content decryption key for decrypting the content. The receiver requires access to the content decryption key to enable the receiver to decrypt the content. In particular, the receiver requires access to an unencrypted version of the content decryption key since the receiver cannot decrypt the content using an encrypted version of the content decryption key. Thus, in this embodiment, content keys are used to control access to the content.

For example, the control information may include a content key file that is specific to a given client device. The uniqueness can be in the file reference. In order to make it difficult for another client to obtain or load the new content key the content key information may be encrypted with a unique client key. Various protection techniques are available to securely load the content key for decryption of the content chunks. Note that there can be additional keys in order to load and/or distribute the content keys. For example, the content keys may be encrypted under a higher level key which allows a group of clients to share the same content key file as will be described in more detail below with reference to FIGS. 5 and 6). This makes it easier to distribute the updated content keys without needing point to point communication sessions.

When updating the content keys (as in step S103 of FIG. 3), the key updates can be aligned with the use of a new content chunk reference. This key alignment can be achieved implicitly (change keys for the next content chunk), but also can be signalled in the metadata distributed with the content keys. By aligning the content keys with the loading of a new content chunk, a seamless update of the content key can be achieved.

For the identified receiver, the updated control information does not enable the identified receiver to access an updated content decryption key for the second portion of the content. Advantageously, the content decryption key is encrypted with a unique key for each receiver.

An embodiment of the invention using a content key implementation is described in further detail below with reference to FIGS. 5 and 6 which use a secured client 50. It is to be understood that this is a specific example of the content key based countermeasure provided by the present invention.

Figure 5:
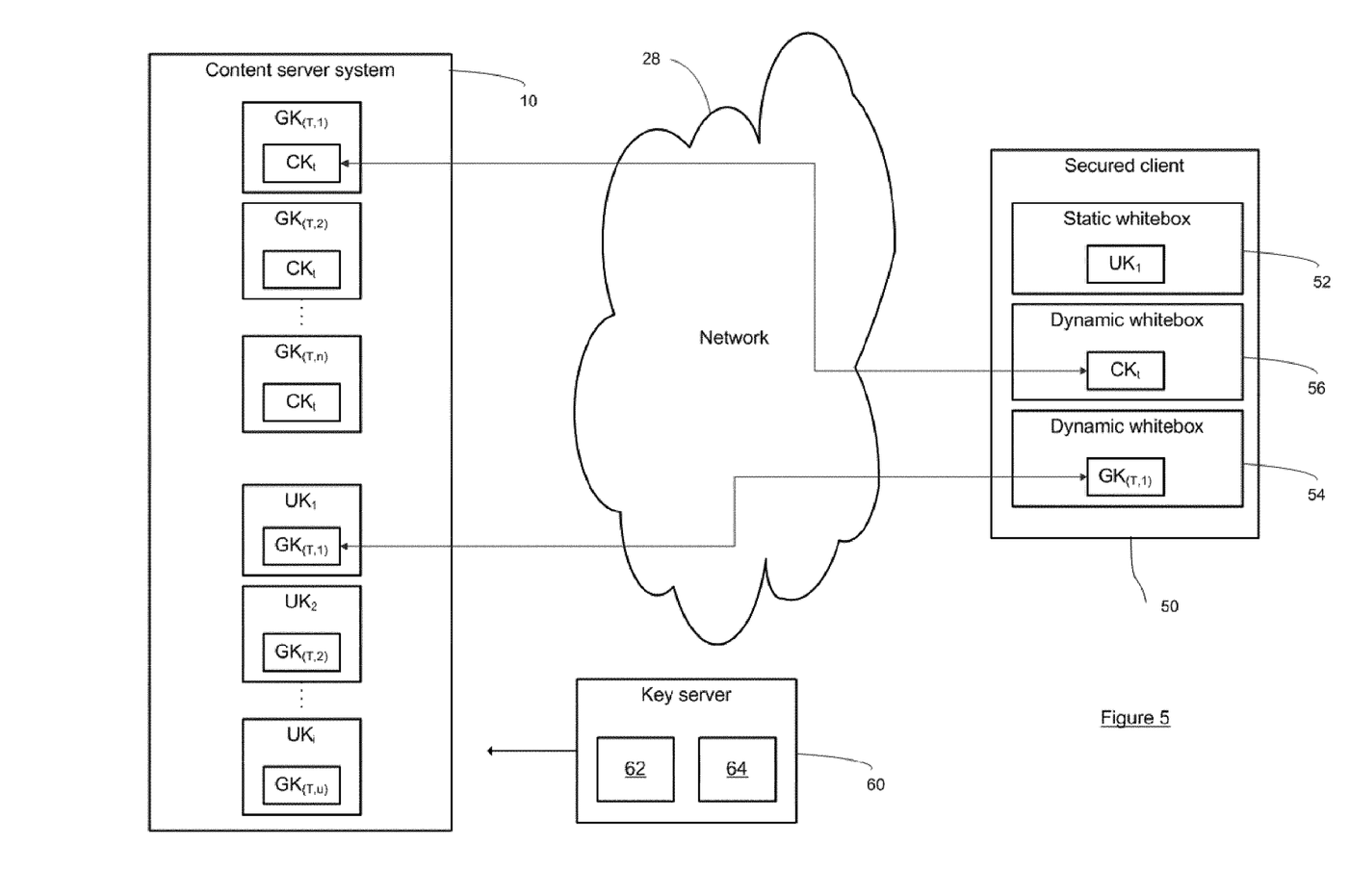
FIGS. 5 schematically illustrates an embodiment of a content key based system of the present invention prior to the implementation of countermeasures.

In the embodiment of FIG. 5, the secured client 50 contains a number of whitebox protected keys that are supplied from the same source as the content itself (i.e. the content server system 10). It will be understood that whitebox is a specific variant of an implementation technology to establish a secured client, and other variants are envisaged within the scope of the present invention to provide secured keys at the client. Each client x has a respective unique key $UK_x$ (NB x=1 for the secured client 50 in FIG. 5). This unique key $UK_x$ is stored in a fixed, static whitebox 52 of the client 50 to ensure it is very difficult to extract from the software. In addition, each client 50 has two dynamic whiteboxes, namely a first dynamic whitebox 54 storing a group key GK and a second dynamic whitebox 56 storing a content key CK. The two dynamic keys GK and CK may be distributed over the network 28 using files from a HTTP server in order to make full use of a CDN and caching if necessary. This makes the system highly scalable.

When the client 50 makes a connection to the server 10 via the network 28 to setup a session for an adaptive stream, it is placed into a group u of clients at a position i (NB i=1, u=1 for the secured client 50 in FIG. 5). The client 50 receives both this position and its unique playlist file used for watermarking (thus playlists and content keys are used in this embodiment). Each group u has a group key $GK_{\{T,u\}}$ for time segment T. The group key $GK_{\{T,u\}}$ is retrieved and placed in the first dynamic whitebox 54 in the client 50, again to protect it against retrieval from the software client. The group key $GK_{\{T,u\}}$ is retrieved from the HTTP server in a file with the identifier of the group at position i and is encrypted using the unique key $UK_x$ of the client 50. Once the group key $GK_{\{T,u\}}$ is known to the client 50, the client 50 is able to retrieve the content key $CK_t$ for time segment t. Again, this is done using a HTTP request to the server and retrieving the content key $CK_t$ in encrypted form with the group key $GK_{\{T,u\}}$. The content key $CK_t$ is then stored in the second dynamic whitebox 56 in the client. The client 50 is then able to decrypt any content chunks for time segment t using content key $CK_t$.

The group key $GK_{\{T,u\}}$ and the content key $CK_t$ are generated by a key server 60. The key server 60 is advantageously a tamper-resistant server that is able to generate unique keys. The key server 60 includes a first key generator 62 for generating the group key $GK_{\{T,u\}}$ and a second key generator 64 for generating the content key $CK_t$. At different pre-determined cycles both the group key $GK_{\{T,u\}}$ and the content key $CK_t$ are cycled by the key server 60. The cycle T for the group keys $GK_{\{T,u\}}$ does not have to be as frequent as the cycle t for the content keys $CK_t$. Preferably, the content keys are cycled every few content chunks (e.g. every 20-60 seconds).

During a session, the client 50 keeps retrieving new chunks to be played back and decrypts these using the content key $CK_t$. When the content key is cycled at t+1, the client makes a connection to the HTTP server and retrieves the new content key $CK_{t+1}$ stored in a file that is encrypted with $GK_{\{T,u\}}$. When the group key is eventually cycled at T+1, the client 50 contacts the HTTP server again requesting a file for group u at position i which is encrypted with its own unique key $UK_x$ at which time the new $GK_{\{T+1,u\}}$ is stored.

Figure 6:
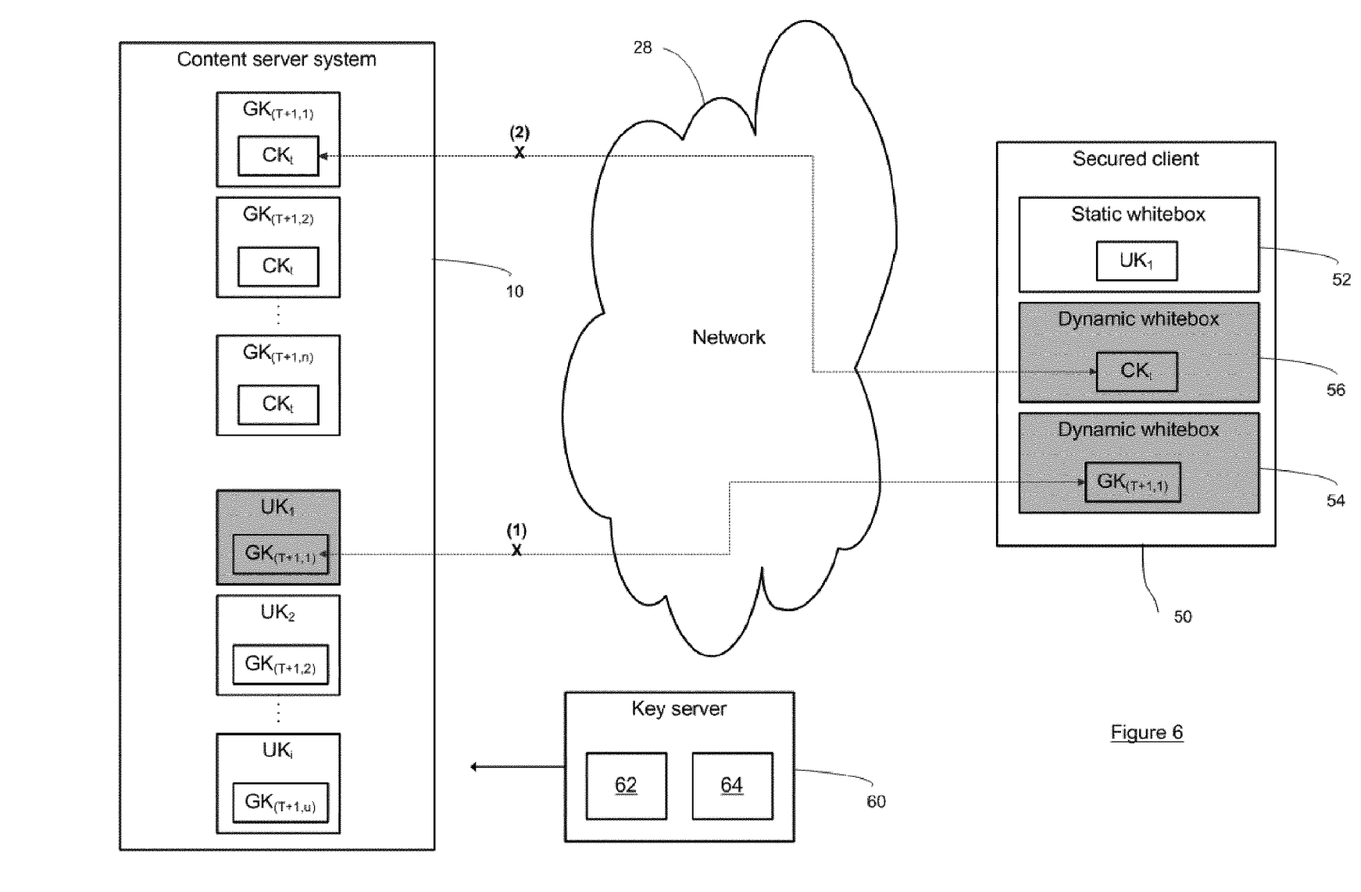
FIG. 6 schematically illustrates the embodiment FIG. 5 after the implementation of countermeasures.

If the client 50 is identified as an "identified receiver" which is taking part in a redistribution attack (like receiver 30 in FIG. 4), the system can issue a command to make sure that the file giving the group key $GK_{\{T+1,u\}}$ to client x at position i is not produced (see the grey shaded part of the server 10 of FIG. 6 indicating that this file is not present). Since the client 50 cannot get the group key $GK_{\{T+1,u\}}$ (see (1) in FIG. 6), the client 50 is unable to decrypt any newly issued content keys (see (2) in FIG. 6) because the newly issued content keys for time segment T are encrypted using the group key $GK_{\{T+1,u\}}$. As a result, the client 50 is unable to decrypt any new content chunks to playback the content.

Since this system is file-based, it is highly scalable system. It will be understood that any or all of (i) the group size, (ii) the group key cycle times, (iii) the content key cycle times, and (iv) the number of key servers may be adjusted to achieve a balance between increasing the speed to cut-off any client identified as participating in a redistribution attack versus scalability and storage space.

In the embodiment of FIGS. 5 and 6, playlists are used to individually fingerprint the content for each receiver, whilst content keys are used to restrict access to updated content once a receiver has been identified (based on its fingerprint) as taking part in an unauthorised redistribution attack. However, it will be understood that the content may be fingerprinted by means of playlist or manifest files or by using content key fingerprinting. Thus, in an alternative content key implementation, content keys are used both for fingerprinting (e.g. as in EP1264436) and for restricting access to updated content. The use of content keys for both purposes is advantageous in that the use of playlists and/or manifest files is not required.

Using Combined Group Files

In one embodiment, for each receiver, the control information for that receiver is stored in a different file from files used to store the control information for other receivers in the plurality of receivers. In other words, each receiver has their own respective file on the server which stores the control information for that receiver.

Advantageously, it is possible to place the control information for a number of clients (or receivers) into a single, combined, group file, thereby providing an alternative to the use of a control information file per receiver. In this alternative embodiment, a large number of client-specific control information files are combined to form the group file. Each client in the group then receives an index reference (or generates a URL index reference) to the group file. The index reference is associated with the file fragment of the group file which holds the unique control information for that client. As described above, the file fragment may comprise unique control information traditionally carried in a playlist, for example. Alternatively, the file fragment may hold the content key control information, which may advantageously be stored in an encrypted form. The file fragment also could contain both types of information.

The use of a group file significantly simplifies server operations since the group file replaces a large number of small files. A client may reference the file fragment of the group file in the same manner as content chunks in a fragmented content file, e.g. using a time value as an index into the fragmented content file. Alternatively, the client may load the entire group file and select the data that it needs after completion of the download. Referencing to a file fragment is more bandwidth efficient than downloading the entire group file, but requires more overhead at the server to fetch fragments. It is possible to combine file fragments into a smaller number of larger file fragments in order to adjust the required bandwidth and server processing overhead.

In the above-described group file embodiment, for at least a subset of the plurality of receivers, the control information is stored in a single combined file (i.e. the group file) for that subset of receivers. Furthermore, for each receiver in the subset of receivers, the control information for that receiver is stored in a different file location (i.e. a different file fragment) from the file locations used to store the control information for other receivers in the subset of receivers. Thus, the control information for some or all of the plurality of receivers is stored in a single combined file, but each receiver has a specific file location for that receiver in which the control information for that receiver is stored. This provides the advantage that the server need only update a single file with updated control information, rather than updating a set of individual files. There may be one large group file for all receivers. Alternatively, the plurality of receivers may be divided to form n separate groups of receivers, such that there would be n group files.

Collusion

Collusion is when a pirate takes multiple legitimate sources and mixes them together before redistributing the content. Collusion may also result from multiple pirates working together to mix the different sources together to produce one content stream. In other words, with reference to FIG. 4, there may be multiple authorised receivers 30 who each grab the content using a respective content grabber 32. The multiple grabbed versions of the content output from the multiple content grabbers 32 may then be combined before re-encoding using the content encoder 34 and redistributing via the network 28. The aim of collusion is to make it more difficult for content providers to detect their watermarks in the re-encoded unauthorized content. When the pirates have access to multiple legitimate sources, each marked by a unique watermark, they are able to look at the differences and then either randomly choose one or mix them together.

However, it is still possible to detect watermarks in re-encoded content following collusion, even without knowing in advance the number of colluders. The more colluders there are, the longer the watermarking keys need to be, and the longer the detection time will be. For example, for a content provider with 10 million subscribers including 4 colluders, it takes about 20 minutes to detect the colluders (assuming one watermarking bit per 2 seconds of content).

Therefore, the present methodology would still be viable for disrupting redistribution attacks involving multiple colluding receivers.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality and modules may be implemented as hardware and/or software. For example, the above-mentioned modules may be implemented as one or more software components for execution by a processor of the system. Alternatively, the above-mentioned modules may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method, implemented by a system of one or more processors, of controlling access to streaming content by a plurality of receivers that are external to the system, the streaming content including a sequence of portions, the method comprising:
for each receiver in the plurality of receivers, providing that receiver with access to first control information for that receiver, wherein the first control information enables that receiver to access a first portion of the streaming content, each receiver being provided an individually identifiable version of the first portion of the streaming content;
receiving information identifying one of the plurality of receivers as an identified receiver which is no longer authorized to access the streaming content;
updating the first control information so as to provide updated control information for each receiver, the updated control information being associated with a second portion of the streaming content, wherein the second portion of the streaming content is subsequent to the first portion of streaming content in the sequence of portions of the streaming content; and
allowing each receiver to fetch the updated control information for that receiver;
wherein the updated control information provided for the identified receiver is invalid such that the identified receiver is unable to fully access the second portion of the content.

2. The method of claim 1 wherein:
the control information comprises key management information for providing access to a content decryption key for decrypting the content; and
for the identified receiver, the updated control information does not enable the identified receiver to access an updated content decryption key for the second portion of the content.

3. The method of claim 2 wherein, for each receiver, the key management information comprises a unique key for that receiver, the unique key being operable to enable that receiver to access the content decryption key for decrypting the content.

4. The method of claim 1 wherein:
the content comprises a time series of content chunks;
the control information comprises a playlist of content chunk references, each content chunk reference being a reference to a respective content chunk of the content; and
for the identified receiver, the updated control information does not include a valid playlist of content chunk references for the second portion of the content.

5. The method of claim 1 wherein:
the content comprises a time series of content chunks disposed in a content file;
the control information comprises a manifest file which enables a receiver to generate URLs relating to content chunks in the content file; and
for the identified receiver, the updated control information does not include a valid manifest file to enable the identified receiver to generate valid URLs for content chunks associated with the second portion of the content.

6. The method of claim 1 wherein configuring each receiver to fetch the updated control information for that receiver comprises:
providing each receiver with an expiration time for the first control information, by which expiration time that receiver should fetch the updated control information for that receiver.

7. The method of claim 1 wherein the content is fingerprinted, and wherein identifying a receiver from the plurality of receivers as an identified receiver comprises:
detecting a fingerprint associated with the identified receiver in an unauthorized instance of the content.

8. The method of claim 1 wherein, for each receiver, the control information for that receiver is stored in a different file from files used to store the control information for other receivers in the plurality of receivers.

9. The method of claim 1 wherein:
for at least a subset of the plurality of receivers, the control information is stored in a single combined file for that subset of receivers; and for each receiver in the subset of receivers, the control information for that receiver is stored in a different file location from the file locations used to store the control information for other receivers in the subset of receivers.

10. The method of claim 1 wherein, for the identified receiver, the updated control information is invalid such that the identified receiver is unable to access any of the second portion of the content.

11. The method of claim 1 wherein the updated control information for the identified receiver comprises a null file entry.

12. The method of claim 1 wherein:
the content comprises a time series of content chunks; and
the first and second portions of the content are each associated with a respective integer number of content chunks.

13. A server comprising one or more processors configured to control access to streaming content by a plurality of receivers that are external to the system, the streaming content including a sequence of portions, by:
for each receiver in the plurality of receivers, providing that receiver with access to first control information for that receiver, wherein the first control information enables that receiver to access a first portion of the streaming content, each receiver being provided an individually identifiable version of the first portion of the streaming content;
receiving information identifying one of the plurality of receivers as an identified receiver which is no longer authorized to access the streaming content;
updating the first control information so as to provide updated control information for each receiver, the updated control information being associated with a second portion of the streaming content, wherein the second portion of the streaming content is subsequent to the first portion of streaming content in the sequence of portions of the streaming content; and
allowing each receiver to fetch the updated control information for that receiver;
wherein the updated control information provided for the identified receiver is invalid such that the identified receiver is unable to fully access the second portion of the content.

14. One or more tangible computer readable media comprising computer program code which, when executed by a processor, causes the processor to control access to streaming content by a plurality of receivers that are external to the system, the streaming content including a sequence of portions, by:
for each receiver in the plurality of receivers, providing that receiver with access to first control information for that receiver, wherein the first control information enables that receiver to access a first portion of the streaming content, each receiver being provided an individually identifiable version of the first portion of streaming content;
receiving information identifying one of the plurality of receivers as an identified receiver which is no longer authorized to access the streaming content;
updating the first control information so as to provide updated control information for each receiver, the updated control information being associated with a second portion of the streaming content, wherein the second portion of the streaming content is subsequent to the first portion of streaming content in the sequence of portions of the streaming content; and
allowing each receiver to fetch the updated control information for that receiver;
wherein the updated control information provided for the identified receiver is invalid such that the identified receiver is unable to fully access the second portion of the content.

* * * * *